United States Patent [19]
Frederick et al.

[11] 4,002,410
[45] Jan. 11, 1977

[54] APPARATUS AND METHOD FOR ORIENTING MONOCRYSTALLINE MATERIAL FOR SAWING

[75] Inventors: Roger A. Frederick, St. Louis; Thomas E. Reichard, Kirkwood, both of Mo.

[73] Assignee: Monsanta Company, St. Louis, Mo.

[22] Filed: Mar. 17, 1975

[21] Appl. No.: 559,194

[52] U.S. Cl. .............................. 356/31; 356/138
[51] Int. Cl.² ...................................... G01N 21/04
[58] Field of Search ............ 356/31, 129, 138, 140, 356/142, 144, 145, 146, 147

[56] References Cited
UNITED STATES PATENTS

| | | | |
|---|---|---|---|
| 2,973,687 | 3/1961 | Pennington et al. | 356/31 |
| 3,124,638 | 3/1964 | Loro | 356/31 |
| 3,518,005 | 6/1970 | Weber | 356/138 |

FOREIGN PATENTS OR APPLICATIONS

| | | | |
|---|---|---|---|
| 201,720 | 9/1967 | U.S.S.R. | 356/129 |

OTHER PUBLICATIONS

Carl Zeiss, Crystal Orientation Device, Descriptive Brochure, HZ–VIII/63 PTo.

*Primary Examiner*—John K. Corbin
*Assistant Examiner*—Richard A. Rosenberger
*Attorney, Agent, or Firm*—Peter S. Gilster

[57] ABSTRACT

A small portable device quickly secured to and removed from a body of monocrystalline material to be sawed and useful for aligning the body with respect to a saw blade, permitting sawing with precisely predetermined crystallographic orientation. The device has a viewing screen, a light source, and first and second autocollimators. The first autocollimator directs a first collimated light beam toward a surface of the material. The resultant reverse reflection is directed back through the collimating lens and a beam splitter images the reflection on the screen, providing a pattern on the screen characteristic of a crystallographic plane of the material, the pattern position corresponding to the orientation of the device with respect to the crystallographic plane. The second autocollimator directs a second collimated light beam toward the saw blade surface, the resultant reflection being directed back through its collimating lens and imaged on the screen as a second pattern having a position corresponding to the orientation of the blade with respect to the device. A small enclosure contains the screen, light source, both autocollimators, and imaging optics. A clamp arrangement secures the enclosure to the monocrystalline body and permits selective orientation of said device with respect to the body.

13 Claims, 6 Drawing Figures

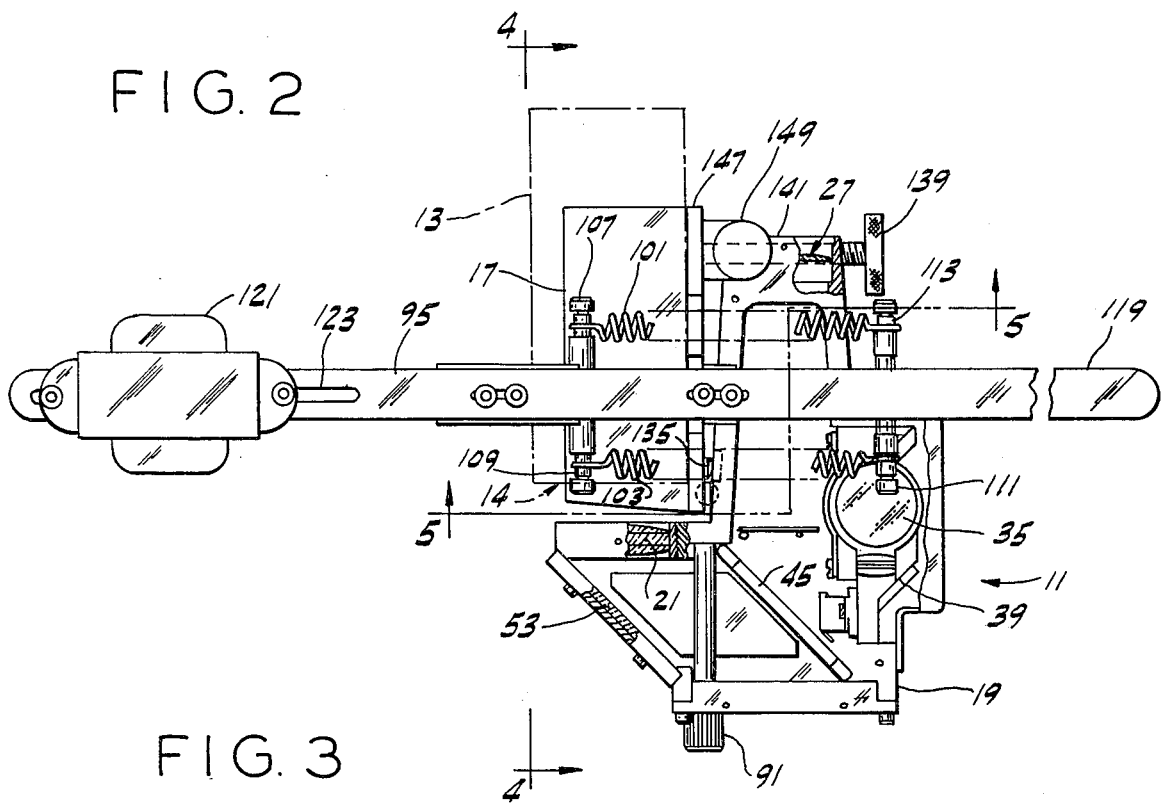
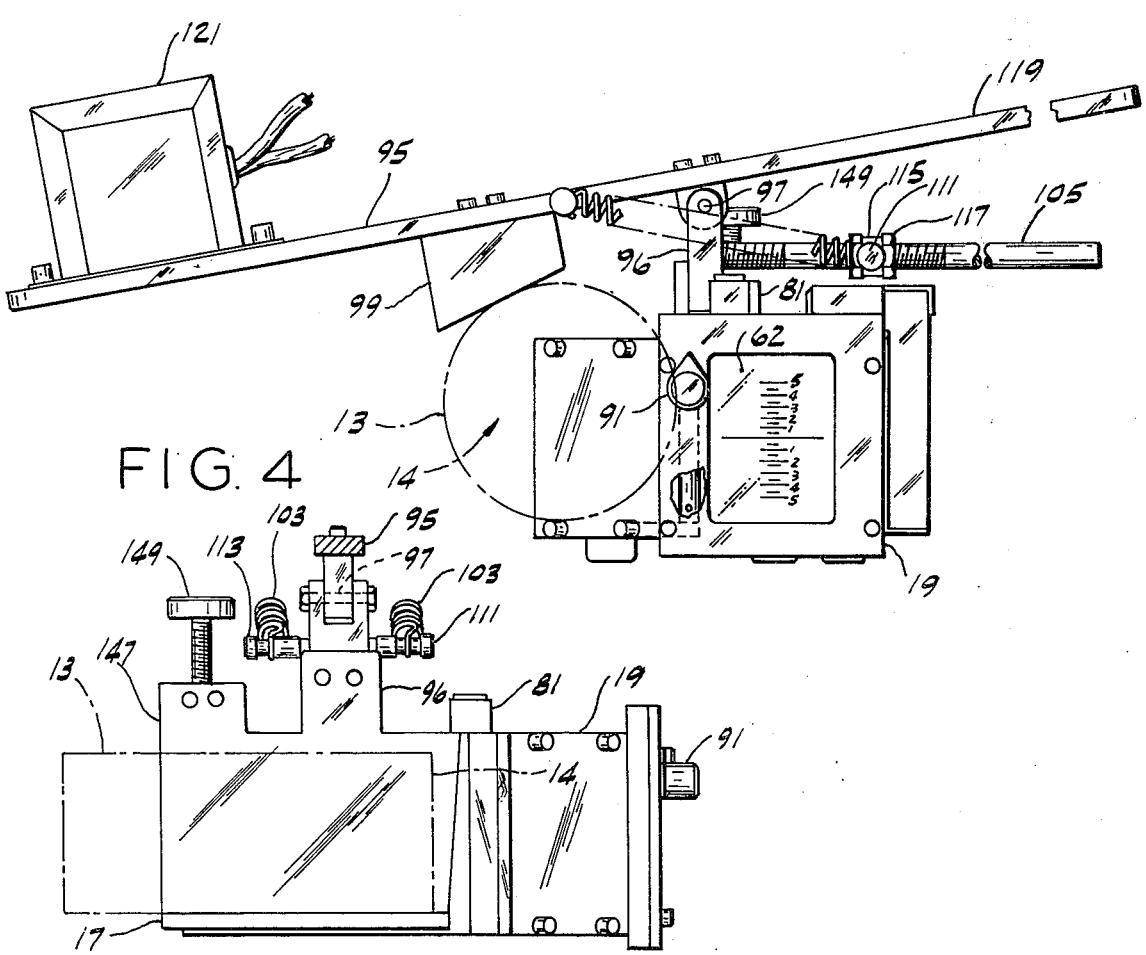

APPARATUS AND METHOD FOR ORIENTING MONOCRYSTALLINE MATERIAL FOR SAWING

BACKGROUND OF THE INVENTION

This invention relates to the orientation of monocrystalline materials, and more particularly, to the sawing of such materials with predetermined crystallographic orientation.

One step which is typical in the processing of semiconductor materials, such as single crystal silicon pulled by the Czochralski process from a melt of polycrystalline silicon, involves mounting a generally cylindrical single crystal (monocrystalline) rod or so-called "billet" and then sawing the billet into thin wafers or slices. This is referred to in the art as "slicing." It is desirable to cut in a precisely predetermined direction with respect to the various crystallographic planes of the material. A specific explanation of the reasons and other considerations which are involved in crystallographic orientation of silicon are described in the article by D. O. Townley, "Optimum Crystallographic Orientation for Silicon Device Fabrication," *Solid State Technology*, Jan. 1973. It may be preferred to saw the material with the saw blade either parallel to a specific crystallographic plane or tilt it at a small angle, e.g., 4°–5°, from a specific plane.

Crystallographic orientation for this purpose can be ascertained precisely using x-ray diffraction methods. X-ray equipment is cumbersome and expensive and, in addition, requires time-consuming transfer of a semiconductor rod or billet to be sliced from the x-ray equipment to the saw. Thus, as a practical matter, it is inconvenient and costly to use x-ray diffraction orientation. OpticaL orientation can instead be employed. For this purpose, a hot caustic or acetic acid etch is used to develop small facets in a face of the monocrystalline material. These facets preferentially expose certain crystallographic planes. The etched surface then reflects light in directions determined by the crystallographic planar orientation, rather than the plane of the original cut surface or face of the material. Methods other than etching, such as grinding, abrading or the like, can be used to preferentially expose specific crystal faces.

In one prior art commercial use of optical orientation for slicing, the slicing process includes the steps of rod mounting (i.e., mounting of the billet), orientation, and sawing. In rod mounting, the rods are glued to blocks of a suitable material which will hold the slices in place after they have been sawed. Mounting is tied to orientation in this process since the rods must be located in specific geometric relationship to the blocks in order that the slices can be sawed in the specific crystallographic orientation. Orientation is achieved by tilting the rod with respect to the blade plane in a fixture which holds the billet or rod by clamping the block. The angles of tilt are first set by aligning the optical reflection pattern of an etched end of the rod. Final adjustment is made after the slice has been cut and its exact angle to the crystallographic axis determined by x-ray diffraction.

As will be known to those skilled in the art, sawing of monocrystlline materials such as silicon is quite often carried out using an inside diameter (I.D.) saw. An I.D. blade is typically a very thin, annular stainless steel disk having cutting materials such as diamond dust in a matrix coating the inside cutting edge of the blade.

A device useful in carrying out the optical orientation in this commercial process is commercially available from the Sylvania Company and is known as the Sylvania Crystal Orientation Instrument. Its use typically requires objectionable transfer of the rod to be sawed on a fixture from the instrument to the saw.

Other instruments are all also commercially avialable which can be used for optical orientation for crystals in sawing. One of these devices, which is commercially available from the Carl Zeiss Company, Oberkochen, Wuerttemberg, Germany, is basically an autocollimating telescope. However, none of these are fully satisfactory when used in conjunction with a saw, either because they lack portability, are not self-contained, provide poor optical performance, or their accuracy is dependent upon precise positioning or distance of the device from the monocrystalline material which is to be optically oriented, or rerequire transfer of the rod to be sawed between the instrument and the saw. These prior art devices are typically not truly compact, light in weight, simple, and fully reliable when used to align crystals for sawing.

However, it is believed that heretofore there has not been known or suggested in the art a small, portable device which can be attached to body of monocrystalline material to be sawed and which device includes dual autocollimators having parallel collimation axes with one autocollimator directing a collimated beam of light on the body of material and the other directing a collimated beam of light on the saw blade.

SUMMARY OF THE INVENTION

Among the several objects of the invention may be noted the provision of an improved device for optical orientation of a body of monocrystalline material; the provision of such a device and method which are useful for aligning such a body with respect to a saw blade in order to permit sawing of the material by the blade with precisely predetermined crystallographic orientation; the provision of such a device which can be used for optical orientation of such a body of monocyrstalline material after the body has been secured in a fixture of the saw; the provision having accuracy which is substantially independent of changes in the positioning or distance of the device from said material. The provision of such a device the optical alignment of which can be readily checked; the provision of such a device which is self-contained and which is sufficiently compact, lightweight and small that it can be clamped to the body of material and supported by this body when the body is secured in a fixture of the saw; the provision of such a device which can be quickly secured to and removed from the body of material; the provision of such a device which is of relatively simple, low-cost construction and is conveniently used; and the provision of such a method which is simply, quickly, and effectively carried out.

Briefly, a portable device of the invention is adapted for being quickly secured to and removed from a body of monocrystalline material to be sawed for aligning the body with respect to a saw blade in order to permit sawing of the monocrystalline material by the blade with precisely predetermined crystallographic orientation. The device comprises a viewing screen or displaying imaged light patterns reflected from either the monocrystalline material or the saw blade and at least one light source. A first collimator means including a first lens is provided for collimating the light from the light source to provide a first collimated light beam directed toward a surface of the monocrystalline material for reflection in the reverse direction. The reflection is directed back through the first lens. Means is included for imaging the first said reverse reflection on the screen to display a light pattern characteristic of a crystallograhic plane of the monocrystalline material, the position of the pattern on the screen correspondig to the orientation of the device with respect to said crystallographic plane. A second collimator means, including a second lens, is provided for collimating the light from the light source to provide a second collimated light beam directed toward the surface of the blade for reflection in the reverse direction, this reflection being directed back through the second lens. Means is also included for imaging the second said reverse reflection on the screen to display a light pattern the position of which on the screen corresponds to the orientation of the blade with respect to the device. A small enclosure contains the screen, the light source, both collimator means, and both imaging means. Provision is made for clamping the enclosure to the body of monocrystalline material and for selectively orienting the device with respect to said body. As preferentially constructed, the collimated light beams are parallel. I.e., the axes of the collimator means are parallel.

As a method of aligning the body of monocrystalline material with respect to the saw blade to permit sawing thereof with precisely predetermined crystallographic orientation, the invention involves providing in an enclosure adapted for being clamped to said body first and second autocollimators, said autocollimators directing first and second collimated light beams toward said body and saw blade, respectively, for reflection therefrom and further providing in said enclosure a display screen and means for imaging and displaying the reflected beams on the screen as first and second patterns uniquely characteristic of a crystallograhic plane of said body and characteristic of the plane of said saw blade, respectively. Then said body of monocrystalline material is mounted in a positionable sawing fixture of the saw. Next, the method involves determining first by observation of said first pattern the orientation of the enclosure with respect to a predetermined crystallographic plane of said material and then determining second by observation of said second pattern the orientation of the plane of the saw blade with respect to the enclosure. Finally, the sawing fixture is positioned to orient said predetermined crystallographic plane of the material with respect to the saw blade plane on the basis of the first and second determinations.

Other objects and features will be in part apparent or pointed out hereinbelow.

BRIEF DESCRIPTION OF THE DRAWINGS

FIG. 2 is a top elevation biew of the device, a top cover of the device being shown broken away to illustrate internal structure;

FIG. 3 is a front elevation view of the device;

FIG. 4 is a left side cross-sectional view of the device, taken along line 4 — 4 of FIG. 2;

Corresponding reference characters indicate corresponding parts throughout the views of the drawings.

DESCRIPTION OF THE PREFERRED EMBODIMENTS

Figure 1:
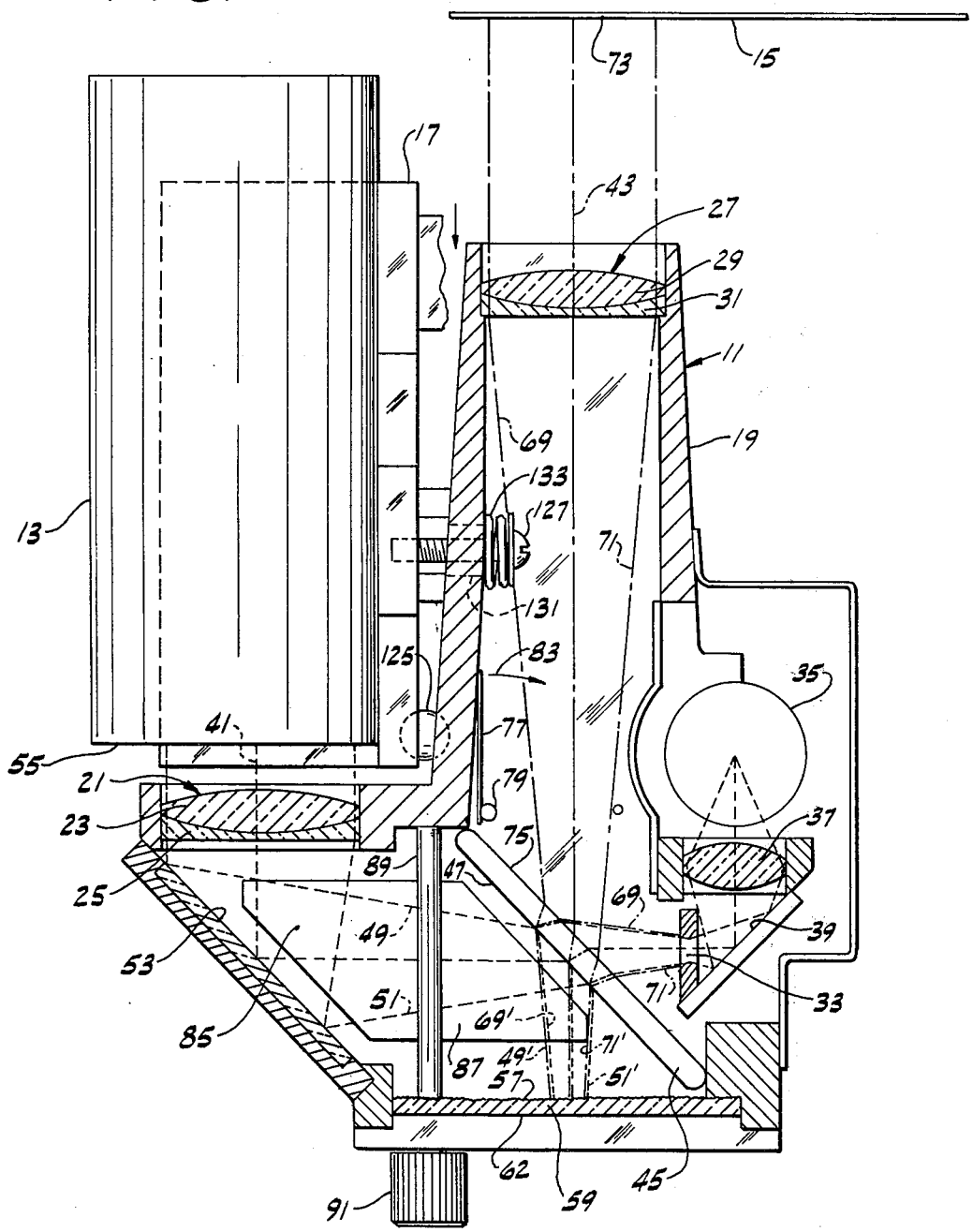
FIG. 1 is an enlarged top cross-sectional view taken horizontaly through the new device, the device being shown secured to a body of monocrystalline material, and schematically illustrating the optical principles and operation thereof for aligning the body of monocrystalline material with respect to a saw blade for sawing the blade.

Referring to FIG. 1, a device of the present invention is designated generally at 11. The device is adapted to be clamped to a body 13 of monocrystalline material such as a generally cylindrical rod of single crystal silicon after the rod has been secured in a suitably positionable fixture of a saw having a planar saw blade, a section of which is illustrated at 15. The device includes a clamping bracket assembly 17 and an optical assembly or enclosure 19 having dual autocollimators. The first such autocollimator has an achromatic compound objective lens indicated generally at 21 having a convex-convex element 23 and a plano-concave element 25. A similar achromatic compound objective lens of the second autocollimator is indicated generally at 27 and includes similar elements 29 and 31.

Each of these collimating lenses has a focal length such that a circular aperture 33 is located at the focus of each lens although, in the present device, it will be apparent that the focal length of the collimating lenses 21 and 27 are different.

Aperture 33 is circular in shape in order to provide a source of light of predefined shape, i.e., a spot. For this purpose, a lightbulb 35 provides light through a condensing lens 37 which is reflected off a first surface mirror 39 to unformly illuminate aperture 33. In accordance with the invention, the axes of collimation of the two autocollimators are precisely parallel. The light ray path representing the axis of collimation of the first autocolimator is indicated by the light ray path designated 41 and the axis of collimation of the second autocollimator is designated by the light ray path indicated at 43. It will be seen that the light rays which are associated with the first autocollimator are designated by dashed lines and that the light ray paths associated with the second autocollimator are designated by interrupted lines and dashes.

Positioned at a 45° angle to the two axes of collimation is a beam splitter 45. This comprises a pane of glass having a partly reflective, partly light transmissive coating on one surface 47, and an anti-reflective coating on the other surface 75. Thus, it will be seen that light rays generated by lightbulb 35 are condensed by condenser lens 37, reflected off mirror 39 to uniformly illuminate aperture 33. The aperture, serving as a source of uniform light, then supplies rays of light such as those designated at 49 and 51 which are diffracted by beam splitter 45 and are then reflected off a first surface mirror 53 toward collimation lens 21. These rays accordingly form a collimated beam of light which is directed toward a surface 53 of rod 13. For this purpose, it is desirable to etch, grind or abrade or otherwise preferentially expose facets of the monocrystalline material.

This first collimated beam of light is reflected in the reverse direction back to lens 21, further reflected off mirror surface 53 and toward the surface 47 of beam splitter 45. Here they are further reflected as indicated by the rays designated 49' and 51'. These further-reflected rays impinge on the frosted surface 57 of a viewing screen 59. From this it will be seen that the reverse-direction reflection off the monocrystalline material is imaged on the screen causing there to be displayed on the screen a light pattern characteristic of a crystallographic plane of the monocrystalline material. the position of this pattern on the screen corresponds to the orientation of device 11 with respect to this predetermined crystallographic plane. Assuming this plane is the (1 1 1) plane of silicon, the pattern will be of a propeller configuration as shown at 61 in FIG. 6, wherein the front surface of the screen is designated at 62. The frosted rear surface 57 has angular orientation graduations 63 thereon calibrated in degrees with respect to a reference line 65. A small light pattern is depicted at 67. This pattern is produced by the second autocollimator.

Referring again to FIG. 1, the second collimator works in this way: light rays such as those shown at 69 and 71 pass through the beam splitter 45 and reflected off the front surface 47, pass back through the beam splitter 45, pass through the collimating objective 27, and are collimated along collimation axis 43 and directed as a collimated beam toward the metal reflective surface 73 of saw blade 15. This surface being planar, the collimated beam is reflected in the reverse direction back through lens 27, the reflected rays being diffracted by beam splitter 45 and passing through the splitter as indicated at 69' and 71' where they impinge on the forsted surface 57 of screen 59. This results in pattern 67 depicted in FIG. 6, the position of this pattern on the screen corresponding to the orientation of the blade with respect to device 11.

The positions of pattern 61 and pattern 67 on screen face 62 can both be adjusted by adjustment features associated with bracket 17 which clamp the enclosure to the body of monocrystalline material and which selectively orient device 11 with respect to this body 13.

Included within enclosure 19 are first and second sets of shutters which are controlled by knobs for selecting which of the first and second reverse reflections is imaged on the screen. A first shutter 77 is secured to a shaft 79 having a knob 81 (see FIG. 3) extending from enclosure 19 for movement of shutter 77 in the direction indicated by an arrow 83 in order to swing across the chamber in front of beam splitter 45 in order to block an image from the second autocollimator from being displayed on screen 59. Another set of shutters comprises a first shutter half 85 and a second shutter half 87 each supported by a shaft such as shown at 89 and controlled by a knob 91, operation of which causes rotation of both shafts supporting shutter halves 85 and 87, causing them to close and block the image reflected back through the first autocollimator from being displayed on screen 59. These two shafts are coupled by a dial cord loop or the like.

Referring now to FIGS. 2 – 5, bracket 17 is seen (see FIG. 5) to be L-shaped in cross section, having two interconnectiong surfaces 93 and 95 for contacting the curved surface of rod 13, the latter being of generally circular cross section. An arm 95 is pivotally secured to a short vertical post 96 of enclosure 19 at a pivot point 97 and extends perpendicular across the collimation axes 41 and 43.

This arm carries a bearing block 91 spaced from the pivot point for bearing against rod 13 in order to contact the rod for forcing the surfaces 93 and 95 against rod 13. For this purpose, a set of springs 101 and 103 extend between arm 95 and a rod 105 which serves as a grip or handle of the enclosure, the latter extending from enclosure 19 as shown in FIG. 3. Springs 101 and 103 are secured to the arm by means of studs 107 and 109 which protrude from arm 95. Similar studs 111 and 113 extend from an adjustable collar 115 secured by locknuts 117 threaded on rod 105. As shown most clearly in FIG. 3, a distal portion 119 of arm 95 extends to the right of pivot point 97. This portion together with rod 105 provide a means for the operator to carry the device, and by squeezing portion 119 against rod 105, to swing the bearing block or portion 99 of the arm in a direction away from bracket 17 in order to quickly secure the device to rod 13, and by the same token, to quickly remove it from the rod after optical orientation has been completed.

In order to provide for balance for the device when it is secured to rod 13 or a similar body of monocrystalline material, a step-down transformer 121 for powering lamp 35 is secured to outermost portion of arm 95, it being understood that the weight of transformer 121 compensates for the center of gravity of enclosure 19 so that, when the device is secured to rod 13, it will be in balance and will not tend to rotate on the rod. Arm 95 is slotted as indicated at 23 in order to permit adjustment of the position of transformer 121 to a suitable distance from pivot 97 depending upon the diameter of rod 13.

Figure 5:
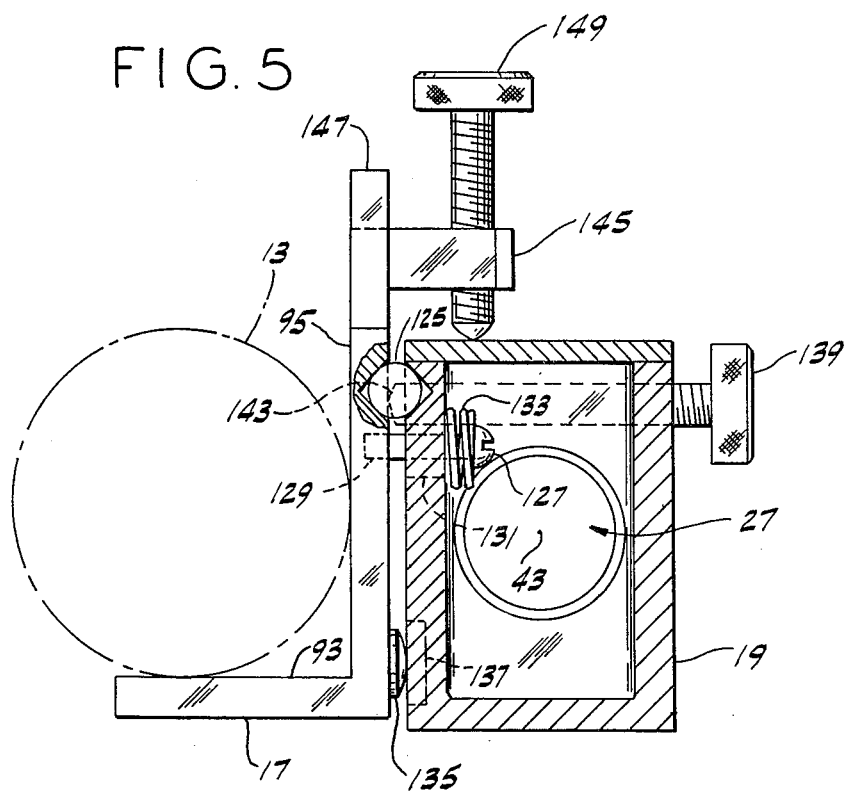
FIG. 5 is an enlarged cross-sectional view taken along line 5 — 5 of FIG. 2, illustrating a bracket feature of the device.

The cross-sectional view of FIG. 5 illustrates that bracket 17 has a pivotal relationship to enclosure 19 of the device by virtue of a ball pivot 125 and is loosely and resiliently secured to the enclosure by a screw 127 threaded as indicated at 129 to bracket 17. This screw extends with a loose fit through a slot 131 in the wall of enclosure 19. This screw is tightened to compress a spring 133 against the interior wall of the enclosure, thereby to resiliently urge bracket 17 against enclosure 19. Located near the apex of the bracket toward the front of the device is a projection 135 serving as a radius locator button for providing a lower point of bearing which bears against a suitable wear pad 137 imbedded within the exterior surface of enclosure 19.

At 139 is indicated an ajustment screw which is threaded through a rear portion 141 of enclosure 19, extending through the enclosure with its end 143 extending from the enclosure and contacting the side of bracket 17. by being screwed in or out, screw 139 provides for changing the spacing between the bracket 17 and enclosure 19 for varying the horizontal annular orientation of the bracket with respect to the enclosure. Bracket 17 has a small horizontal projection 145 which extends horizontally from the vertical portion 147 of the bracket. Through portion 145 is threaded another adjustment screw 149 for selectively varying the vertical angular orientation of the bracket with respect to the enclosure, which is preferably of machined aluminum.

As a procedure for optical orientation of billet or rod 13 on a conventional saw having a flat blade 15 as shown, it is first required to mount rod 13 in a positionable sawing fixture of the saw, it being understood that a conventionalI.D. saw of the type previously noted includes such a fixture. The enclosure 19 of the device is then clamped to rod 13 in the manner previously described, and as shown in FIG. 3, such that the patterns depicted in FIG. 6 can be displayed on screen 62. Conventional AC line voltage is then supplied to the primary of transformer 121 by a suitable power cord for powering lamp 35.

It is first preferred to display the pattern produced on screen 62 by reflection of the collimated light beam off the etched face 14 of rod 13. This is effected by adjusting knob 81 to close shutter 77 and by adjusting knob 91 to open shutter halves 85 and 87. Adjustment screws 139 and 149 are then turned to move the pattern 61 (see FIG. 6) so that the center spot of this propeller-shaped pattern is moved to the center of the screen, i.e., as indicated. In this way, observation of the first pattern 61 is used to first determine the orientation of enclosure 19 with respect to a pre-determined crystallographic plane of the monocrystalline material, for example, the (1 1 1) plane illustrated in FIG. 6.

Figure 6:
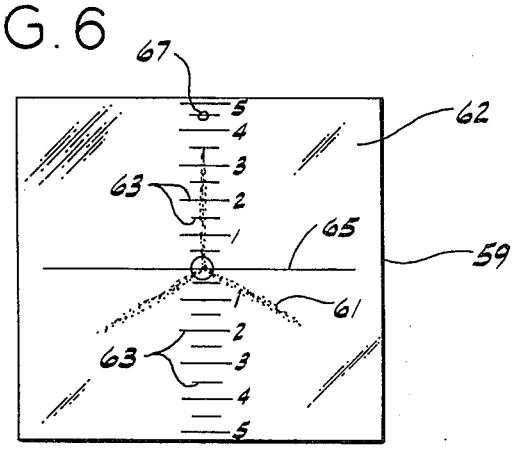
FIG. 6 is a front view of a screen of the device, showing light patterns displayed on the screen.

Knobs 81 and 91 are then adjusted to cause the shutters to block the lobed plattern produced by reflection from rod 13 and to permit instead the pattern produced by reflection off saw blade 15 to be displayed on screen 59. This results in a spot pattern 67 shown in FIG. 6. The saw fixture clamping rod 13 is then adjusted to move pattern 67 either vertically or horizontally on screen 59 in accordance with a desired orientation of the saw blade with respect to the crystallographic plane represented by lobed pattern 61. For example, if a sawing or slicing specification calls for 4°28' vertical and 0° horizontal orientation, pattern 67 will appear as indicated in FIG. 6. If the specification calls for 0° vertical, 0° horizontal orientation, pattern 67 would be centered at the intersection of the cross-hairs on FIG. 6. In this way, it will be seen that the pattern is observed to provide a determination of the orientation of the plane of the saw blade with respect to the enclosure and the sawing fixture is positioned to orient the predetermined plane of the material with respect to the saw blade on the basis of the first determination, i.e., by observing the first pattern 61, and by the second determination, i.e., observation of pattern 67. It may be noted with respect to this first determination that the step of adjusting screws 139 and 149 effectively adjusts the orienation of enclosure 19 with respect to the pre-determined crystallographic plane (represented by pattern 61).

It may be desirable at this point to recheck that the image produced by reflection from rod 13, i.e., pattern 61, is still at the cross-hairs. Then the adjustment steps can then be gone through once more.

With this orientation complete, device 11 may be removed from rod 13. A slice may then be sawed and its orientation checked by x-ray crystallography, if desired, and any further small corrections made.

Proper alignment of the optical components of the device is initially established by placing a single plane mirror in front of both collimators and adjusting the optical component so that both light spots (each collimator producing a spot pattern on the screen) arrive simultaneously exactly at the center crosslines of the screen. The alignment can subsequently be checked easily by this same method, e.g., after use. No mechanical alignments of the saws or billet mountings are involved in the alignment checking procedures. If both spots are at the center crosslines from a single plane mirror, it is assured that the axes of the two collimators are precisely parallel.

In view of the foregoing, it will be seen that the several objects of the invention are achieved and other advantages are attained.

As various changes could be made in the above constructions and methods without departing from the scope of the invention, it is intended that all matter contained in the foregoing description, or shown in the accompanying drawings, shall be interpreted as illustrative rather than in a limiting sense.

What is claimed is:
1. A portable device adapted for being quickly secured to and removed from a body of monocrystalline material to be sawed for aligning said body with respect to a saw balde in order to permit sawing of said monocrystalline material by the blade with precisely predetermined crystallographic orientation, said device comprising:
   a viewing screen for displaying imaged light patterns;
   at least one light source;
   first collimator means, including a first lens, for collimating the light from the light souce to provide a first collimated light beam directed toward a surface of the monocrystalline material for reflection in the reverse direction, the reverse reflection being directed back through the first lens;
   means for imaging the first said reverse reflection on the screen to display on the screen a light pattern characteristic of a crystallographic plane of the monocrystalline material, the position of said pattern on the screen correspondig to the orientation of said device with respect to said crystallographic plane;
   second collimator means, including a second lens, for collimating the light from the light source to provide a second collimated light beam directed toward the surface of the blade for reflection in the reverse direction, the reverse reflection being directed back through the second lens;
   means for imaging the second said reverse reflection on the screen to display on the screen a light pattern the position of which on the screen corresponds to the orientation of the blade with respect to said device;
   a small enclosure for containing the screen, the light source both collimator means, and both said imaging means; and
   means for clamping said enclosure to the body of monocrystalline material and for selectively orienting said device with respect to said body.

2. Apparatus as set forth in claim 1 wherein said means for selectively orienting said device comprises means for finely and selectively adjusting the position of said clamping means with respect to the enclosure whereby the enclosure may be accurately aligned with respect to the body of monocrystalline material.

3. Apparatus as set forth in claim 2 wherein said clamping means comprises a bracket having at least one surface for contacting portions of the body of monocrystalline material and means pivotally secured to the enclosure and adapted to contact said body for forcing said surface against said body.

4. Apparatus as set forth in claim 3 wherein the bracket is pivotally mounted to the enclosure and wherein said adjusting means comprises means for changing the spacing between he bracket and the enclosure for selectively varying the horizontal andvertical angular orientation of said bracket with respect to the enclosure.

5. Apparatus as set forth in claim 3 wherein the bracket is L-shaped in cross-section to provide two intersecting surface for contacting a curved surface of the body of monocrystalline material where said body is of a rod configuration having generally circular cross-section, said means for forcing comprising an arm pivotally secured at a pivot point along its length to the enclsoure, the arm having a portion along its length spaced from the pivot point for bearing against said curved surface, and further comprising means for resiliently urging said portion against said curved surface.

6. Apparatus as set forth in claim 1 further comprising first and second shutters in the enclosure and means for controlling said shutters for selecting which of said first and second reverse reflections is imaged on the screen.

7. Apparatus as set forth in claim 6 wherein the light souce comprises an aperture within the enclosure of predetermined shape, said device further comprising a light bulb in the enclosure and a condenser lens in the enclosure for focusing light from the light bulb on the aperture.

8. Apparatus as set forth in claim 7 further comprising a beam-splitting means in the enclosure having a surface which is both light-transmissive and reflective, light from the light source being transmitted therethrough to form said first collimated light beam but the first-said reverse reflection being further reflected therefrom for imaging on the screen, and light from the light source being reflected therethrough to form said second collimated light beam but the second-said reverse reflection being transmited therethrough for imaging on the screen.

9. Apparatus as set forth in claim 8 wherein the first and second collimator means are oriented with respect to one another such that said first and second collimated beams are parallel.

10. Apparatus as set forth in claim 1 wherein said screen comprises a pane of light-transmissive material having a frosted rear surface on which said reverse relections are imaged and a front surface at the front of the enclosure for viewing by an operator of the device, at least one of the surfaces of said pane having orientation graduations thereon.

11. A method of aligning a body of monocrystalline material with respect to a saw blade to permit sawing of said material by the blade with precisely predetermined crystallographic orientation, said method comprising:
   a. providing in an enclosure adapted for being clamped to said body first and second autocollimators, said autocollimators directing first and second collimated light beams toward said body and saw blade, respectively, for reflection therefrom and further providing in said enclosure a display screen and means for imaging and displaying the reflected beams on the screen as first and second patterns uniquely characteristic of a crystallographic plane of said body and characteristic of the plane of said saw blade, respectively;
   b. mounting said body of monocrystalline material in a positionable sawing fixture of the saw;
   c. clamping said enclosure to said body of monocrystalline material such that said patterns may be displayed on the screen;
   d. determining by observation of said first pattern the orientation of the enclosure with respect to a predetermined crystallographic plane of said material;
   e. determining by observation of said second pattern the orientation of the plane of the saw blade with respect to the enclosure; and
   f. positioning the sawing fixture to orient said predetermined crystallographic plane of the material with respect to the saw blade plane on the basis of said determinations.

12. A method as set forth in claim 11 wherein step (d) is carried out before step (e) and further comprising the step, after step (d) but before step (e), of adjusting the orientation of the enclosure with respect to said predetermined crystallographic plane of the material.

13. A method as set forth in claim 12 whrein step (e) is effected by positioning the sawing fixture in order to adjust the orientation of the plane of the saw blade with respect to the enclosure.

* * * * *